Dec. 11, 1956     H. J. SIEKMANN ET AL     2,773,471

SPEED INDICATING PLATE FOR MACHINE TOOLS

Filed Nov. 7, 1955

INVENTORS.
HAROLD J. SIEKMANN, GEORGE J. KASSELMANN
& WILLIAM OKVIT
BY

ATTORNEY.

United States Patent Office 2,773,471
Patented Dec. 11, 1956

2,773,471

SPEED INDICATING PLATE FOR MACHINE TOOLS

Harold J. Siekmann, George J. Kasselmann, and William Okvit, Cincinnati, Ohio, assignors to The R. K. Le Blond Machine Tool Company, Cincinnati, Ohio, a corporation of Delaware Application November 7, 1955, Serial No. 545,352

3 Claims. (Cl. 116—115.5)

This invention pertains to improvements in speed indicating plates for machine tools and is more particularly directed to an improved direct reading speed indicating plate for engine lathe headstocks.

One of the problems in machine tool manipulation is that of setting the various controls to obtain the proper speeds for the operation of the work or tool spindle with a minimum of effort and skill and thought required upon the part of the operator of the machine so as to distract him to the very minimum with regard to the proper operation and manipulation of the machine tool equipment.

With this end in mind one of the objects of this invention is to provide a speed indicating plate of simple construction which is direct reading for immediate and easy selection of speed changes.

Still another object of this invention is to provide an improved speed indicating plate for engine lathe headstock having a plurality of control levers which may be quickly and easily set by the direct reading of the indicating plate.

A still further object of this invention is to have a plurality of control levers each movable to a series of positions of speed change and to have a common single speed indicating plate positioned adjacent to said levers so that each lever can be moved to the respectively indicated and colored location on the plate for the direct reading of the speed desired.

Further features and advantages of this invention will appear from a detailed description of the drawings in which.

Figure 1:
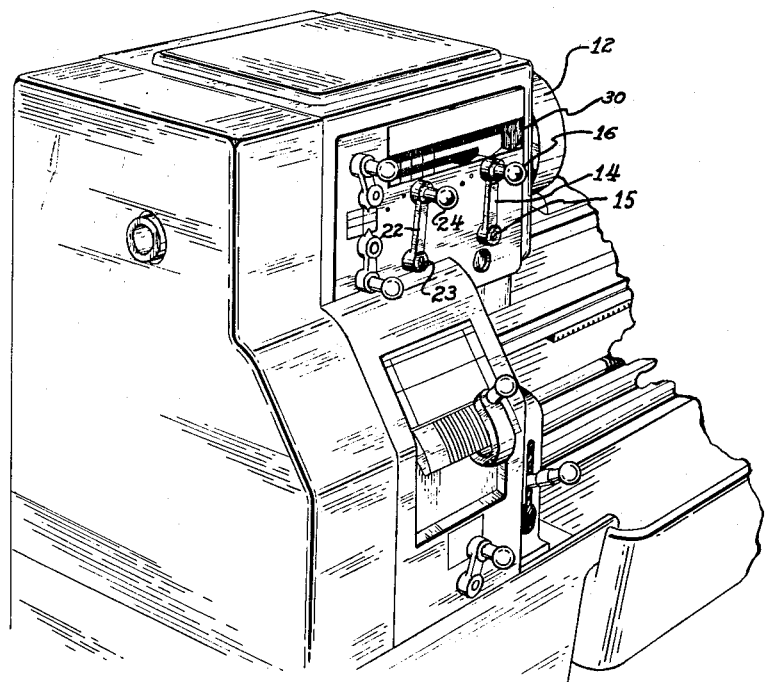
Fig. 1 is a perspective view showing the general environment of use of the speed indicating plate incorporating the features of this invention.

As an example of one embodiment of this invention there is shown an engine lathe having the usual lathe headstock 10 and the work spindle 11, the driving face plate 12 and center 13, which spindle must be arranged to be rotated at various different desired cutting speeds as provided by the power transmission in the lathe headstock 10. In order to adjust the speed of the spindle 11 there is provided the coarse speed change lever 14 pivotally mounted on a suitable shaft 15 in the headstock 10 and connected in a well known manner to shift the gearing in said headstock. The outer end of the coarse speed change lever 14 has the handle or knob 16 and a suitable detent 17 adapted to be engaged in the detent notches or depressions 18, 19 and 20 formed in the face 21 of the headstock 10. Swinging of the lever 14 on the shaft 15 to any of the positions 18, 19 or 20 affects the different coarse speed changes for the work spindle 11.

The fine speed change lever 22 is carried on the shaft 23 suitably journaled in the headstock 10 and connected to the fine speed gear sets therein has a knob 24 in which is provided a detent 25 for engagement with the detent notches 26, 27, 28 and 29 formed in the face 21 of the headstock 20. Thus the fine speed change lever 22 may be moved, in this particular example, to the four positions 26, 27, 28 and 29.

Figure 2:
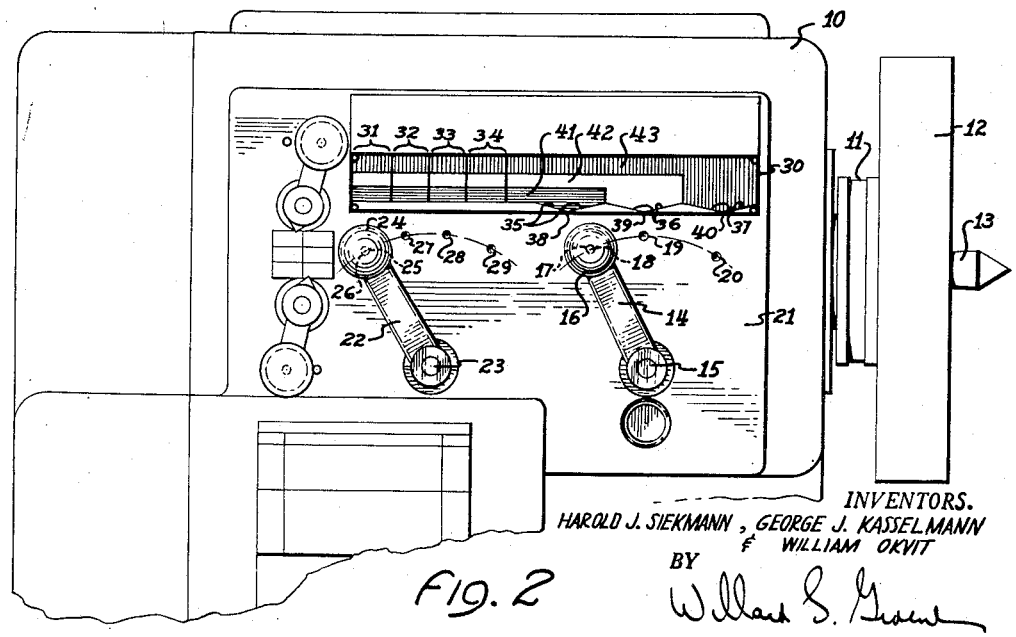
Fig. 2 is a front elevation showing the relationship of the speed plate to the change speed levers of the lathe headstock.

Now the problem is to coordinate the positions of the levers 14 and 22 in such a manner as to facilitate direct selection of the desired speed for the work spindle 11 with a minimum of effort, skill and thought being required upon the part of the operator. To this end there is provided a speed plate 30 suitably fixed to the headstock 10 directly above both of the levers 14 and 22 as best shown in Fig. 2. This plate has a series of vertically extending horizontally spaced boxes 31, 32, 33 and 34 located directly above the respective detent notches 26, 27, 28 and 29 of corresponding positions of the fine speed shifter lever 22. Directly above the coarse speed shifter lever 14 are a series of pointer shaped lines 35, 36 and 37 terminating in the pointer-like apexes respectively at 38, 39 and 40, which apexes coincide substantially with the detent positions 18, 19 and 20 of the coarse speed selector lever. The pointer indicator 35—38 is merged with the horizontally disposed box 41 which extends horizontally to the left, Fig. 2, and transversely across the vertically extending boxes 31, 32, 33 and 34. Similarly, the pointer forming lines 36—39 is merged with a box 42 which likewise extends horizontally to the left just above the box 41 and transversely across the boxes 31, 32, 33 and 34 and finally the pointer indicator at 37—40 merges with a box 43 extending horizontally to the left just above the box 42 and across the boxes 31, 32, 33 and 34. Preferably each of the boxes 41, 42 and 43 and their merged pointers have an individual and distinctive color such as blue for the box 41, white for the box 42 and red for the box 43.

It will thus be noted that there is eye guiding stability and ease of directing the attention of the operator by the arrow boxes 41, 42 and 43 which immediately direct the operator's attention to the situation where whenever the coarse speed lever 14 is positioned under one of its indicating positions 38, 39 and 40 of the speed plate it is an easy and simple matter for the operator to move his eyes directly to the left and note the box that is intersected by the respective boxes 41, 42 and 43 below with which the fine speed lever 22 is positioned. Thus, it is a simple direct observation to determine the speed at which the headstock is operating or to make the necessary quick adjustment of the levers to the desired speed for the work spindle 11.

There has thus been provided a lathe headstock speed indicating dial comprising a common plate positioned adjacent a plurality of speed selector levers having position indicating boxes corresponding to each position of each lever together with line of sign guide boxes which directly interrelate the data on the plate to the position of each of the levers.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A speed indicating plate for a machine tool transmission having a pair of shifter levers comprising, a series of vertically extending horizontally spaced boxes located directly above the shiftable positions of one of said levers, a series of horizontally spaced pointer indicating marks on the bottom edge of said plate to one side of said vertically extending boxes and positioned directly above the shiftable positions of said other lever, and horizontally extending vertically spaced indicating boxes merging with said pointer indicating marks extending upwardly from the lower edge of said plate, said horizontally extending box being arranged transversely across said vertically extending boxes.

2. A speed indicating plate for a machine tool transmission having a pair of shifter levers comprising, a series of vertically extending horizontally spaced boxes located directly above the shiftable positions of one of said levers, a series of horizontally spaced pointer indicating marks on the bottom edge of said plate to one side of said vertically extending boxes and positioned directly above the shiftable positions of said other lever, horizontally extending vertically spaced indicating boxes merging with said pointer indicating marks extending upwardly from the lower edge of said plate, said horizontally extending box being arranged transversely across said vertically extending boxes, and speed indicating numerals in said boxes formed by the intersection of said vertically extending boxes and said horizontally extending indicating boxes.

3. A speed indicating plate for a machine tool transmission having a pair of shifter levers comprising, a series of vertically extending horizontally spaced boxes located directly above the shiftable positions of one of said levers, a series of horizontally spaced pointer indicating marks on the bottom edge of said plate to one side of said vertically extending boxes and positioned directly above the shiftable positions of said other lever, horizontally extending vertically spaced indicating boxes merging with said pointer indicating marks extending upwardly from the lower edge of said plate, said horizontally extending box being arranged transversely across said vertically extending boxes, speed indicating numerals in said boxes formed by the intersection of said vertically extending boxes and said horizontally extending indicating boxes, and a distinctive color presented in each of said pointer indicating marks and horizontally extending boxes.

No references cited.